United States Patent
Bergerhouse et al.

(10) Patent No.: US 10,433,110 B1
(45) Date of Patent: Oct. 1, 2019

(54) PROXIMITY DETECTION USING A SHORT RANGE WIRELESS COMMUNICATION DEVICE

(71) Applicant: Caterpillar Inc., Deerfield, IL (US)

(72) Inventors: Bradley Bergerhouse, Peoria, IL (US); Liliana Olaru, Peoria, IL (US); Albert Kulicz, Tinley Park, IL (US); Joshua D. Reed, Galesburg, IL (US)

(73) Assignee: Caterpillar Inc., Peoria, IL (US)

(*) Notice: Subject to any disclaimer, the term of this patent is extended or adjusted under 35 U.S.C. 154(b) by 0 days.

(21) Appl. No.: 16/005,768

(22) Filed: Jun. 12, 2018

(51) Int. Cl.
*H04W 4/02* (2018.01)
*H04W 4/40* (2018.01)
*H04B 17/318* (2015.01)
*H04W 4/80* (2018.01)

(52) U.S. Cl.
CPC .......... *H04W 4/023* (2013.01); *H04B 17/318* (2015.01); *H04W 4/40* (2018.02); *H04W 4/80* (2018.02)

(58) Field of Classification Search
None
See application file for complete search history.

(56) References Cited

U.S. PATENT DOCUMENTS

| | | | |
|---|---|---|---|
| 9,652,962 B1 | 5/2017 | Bulumulla et al. | |
| 2007/0210960 A1* | 9/2007 | Rofougaran | H01Q 3/26 342/368 |
| 2012/0276847 A1* | 11/2012 | Peterson | G01S 5/0027 455/41.2 |
| 2014/0062724 A1* | 3/2014 | Varoglu | G08G 1/163 340/902 |
| 2017/0092093 A1* | 3/2017 | Dahbura | G08G 1/166 |

* cited by examiner

*Primary Examiner* — Thomas S McCormack
(74) *Attorney, Agent, or Firm* — Harrity & Harrity LLP

(57) ABSTRACT

An example described herein may include receiving a signal associated with a short range wireless communication device. The signal may be received via a receiver device configured to receive the signal when the short range wireless communication device is within an angular range of detection associated with the device. An example may involve determining a value of a parameter associated with the signal and/or determining that the short range wireless communication device is within a threshold distance of a machine based on the value of the parameter. An example may involve performing an action based on the short range wireless communication device being within the threshold distance of the machine.

20 Claims, 5 Drawing Sheets

PROXIMITY DETECTION USING A SHORT RANGE WIRELESS COMMUNICATION DEVICE

TECHNICAL FIELD

The present disclosure relates generally to proximity detection and, more particularly, to proximity detection using a short range wireless communication device.

BACKGROUND

Short range wireless communication enables wireless communication over relatively short distances (e.g., within 30 meters). For example, BLUETOOTH® is a wireless technology standard for exchanging data over short distances using short-wavelength ultra high frequency (UHF) radio waves from 2.4 gigahertz (GHz) to 2.485 GHz. BLUETOOTH® low energy (BLE) is a form of BLUETOOTH® communication that allows for communication with devices running on low power. In some instances, a short range wireless communication device may use a BLUETOOTH® advertisement and/or a BLE advertisement to communicate a presence of the short range wireless communication device and/or attempt to establish a communication session with another device.

Machines used in certain industries (e.g., mining, construction, farming, transportation, or the like) may be relatively large and include a plurality of blind spots within which operators may not be able to detect objects or personnel. Accordingly, an operator may not know or realize that one or more objects or personnel are in the blind spots, when operating a machine, which can lead to a hazardous condition or catastrophic event, such as a collision between the machine and the one or more objects or personnel.

One attempt to detect one or more objects or personnel is disclosed in U.S. Pat. No. 9,652,962 that issued to Bulumulla et al. on May 16, 2017 ("the '962 patent"). In particular, the '962 patent discloses a system that includes a first electronic device configured to attach to an industrial machine or one or more areas of an industrial facility. The first electronic device, of the '962 patent, is to transmit a signal indicative of a potentially hazardous condition with respect to personnel of an industrial facility. The system of the '962 patent also includes a second electronic device communicatively coupled to the first electronic device and configured to attach to a hardhat of the personnel of the industrial facility. The second electronic device of the '962 patent is configured to receive the signal from the first electronic device, determine whether a parameter of the signal is above a threshold, and generate an alarm when the parameter of the signal is above the threshold.

While the system of the '962 patent may identify a potentially hazardous condition and generate an alarm, the alarm is configured to indicate the potentially hazardous condition to the personnel, not the operator of the machine. Furthermore, the first electronic device and the second electronic device of the system of the '962 patent are communicatively coupled, and the first electronic device transmits the signal to the second electronic device from the machine. Accordingly, the second electronic device, being configured to be a wearable device, is to receive the transmitted signal from the first electronic device that is configured on the machine. As such, an operator of the machine of the '962 is not notified from the transmitted signal from the machine.

The device detector of the present disclosure solves one or more of the problems set forth above and/or other problems in the art.

SUMMARY

According to some implementations, a device may include one or more processors to receive a signal associated with a short range wireless communication device, wherein the signal is received via a receiver device configured to receive the signal when the short range wireless communication device is within an angular range of detection associated with the device; determine a value of a parameter associated with the signal; determine that the short range wireless communication device is within a threshold distance of a machine based on the value of the parameter; and perform an action based on the short range wireless communication device being within the threshold distance of the machine.

According to some implementations, a system may include a user interface; and a device monitor to receive, via a receiver device, an advertisement associated with a short range wireless communication device; determine a value of a parameter associated with the advertisement; determine that the short range wireless communication device is within a threshold distance of a machine based on the value of the parameter; and indicate, via one or more output components of the user interface, that the short range wireless communication device is within the threshold distance of the machine to notify an operator of the machine or personnel associated with the short range wireless communication device that the short range wireless communication device is within the threshold distance of the machine.

According to some implementations, receiving, by a device associated with a machine, an advertisement associated with a short range wireless communication device via a receiver device associated with the machine; determining, by the device, a parameter associated with the advertisement; determining, by the device, that the short range wireless communication device is within a threshold distance of the machine based on the parameter; and performing, by the device, an action based on the short range wireless communication device being within the threshold distance of the machine.

DETAILED DESCRIPTION

This disclosure relates to a device detector for detecting proximity to a short range wireless communication device. The device detector has universal applicability to any machine utilizing such a device detector. The term "machine" may refer to any machine that performs an operation associated with an industry such as, for example, mining, construction, farming, transportation, or any other industry. As some examples, the machine may be a vehicle, a backhoe loader, a cold planer, a wheel loader, a compactor, a feller buncher, a forest machine, a forwarder, a harvester, an excavator, an industrial loader, a knuckleboom loader, a material handler, a motor grader, a pipelayer, a road reclaimer, a skid steer loader, a skidder, a telehandler, a tractor, a dozer, a tractor scraper, or other paving or underground mining equipment. Moreover, one or more implements may be connected to the machine.

Figure 1:
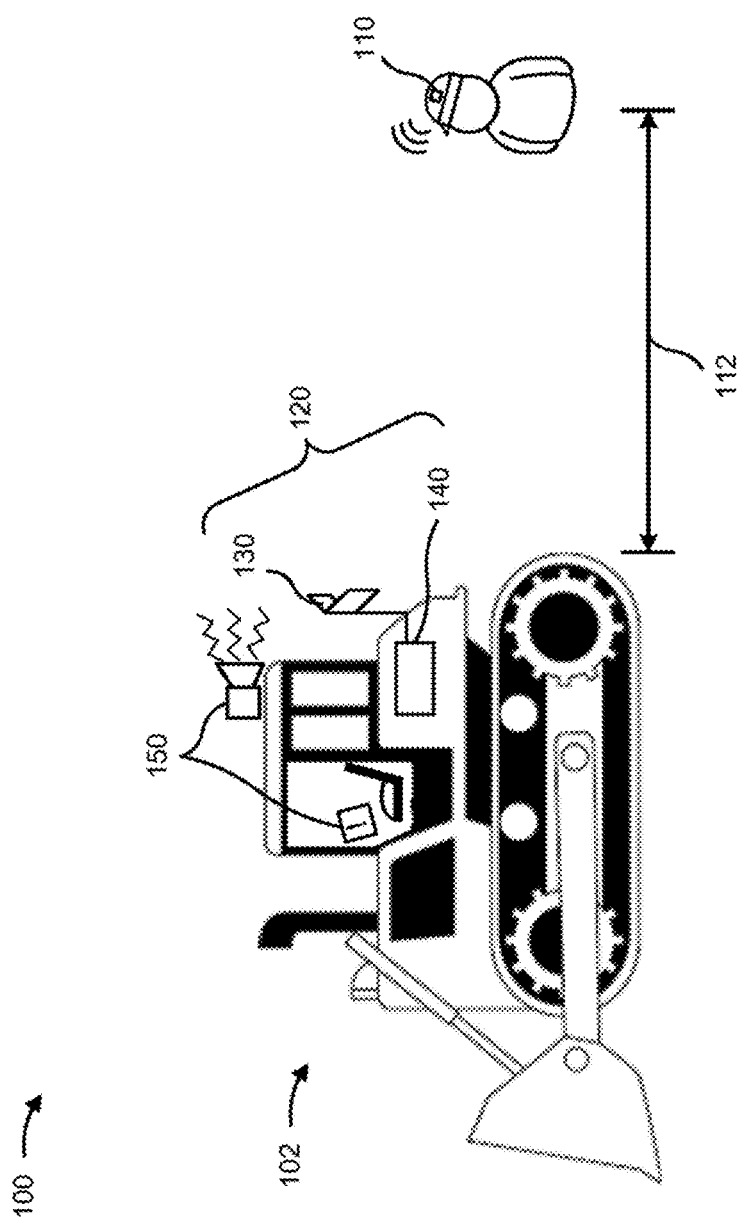
FIG. 1 is a diagram of an overview of an example implementation described herein.

FIG. 1 is a diagram of an overview of an example implementation 100 described herein. The example implementation 100 of FIG. 1 includes a machine 102 with a system configured to detect when a short range wireless communication device 110 is within a threshold distance 112 from the machine 102. As shown in FIG. 1, machine 102 includes a device monitor 120 that includes a receiver device 130 and a device detector 140. Further, machine 102 includes one or more user interfaces 150 (e.g., a display screen, a speaker, and/or the like).

In the example implementation 100 of FIG. 1, short range wireless communication device 110 is attached to a helmet of personnel. For example, the personnel may be a worker at a site at which machine 102 is performing one or more operations. Short range wireless communication device 110 may be configured to be attached to one or more other items associated with the personnel such that the short range wireless communication device 110 is wearable and/or on the person of the personnel. For example, the personnel may wear short range wireless communication device 110 on a wrist (e.g., similar to a watch), around a neck (e.g., similar to a necklace or lanyard), within clothing, on a belt, or the like. Accordingly, the distance (shown as threshold distance 112) between short range wireless communication device 110 may correspond to or be based on a distance between the personnel wearing the helmet with short range wireless communication device 110 and machine 102.

According to some implementations, device monitor 120, via device detector 140, may determine a distance between short range wireless communication device 110 and machine 102 based on a signal (e.g., an advertisement signal) received, via receiver device 130, from short range wireless communication device 110. When device detector 140 determines that short range wireless communication device 110 is within threshold distance 112 (e.g., based on a received signal strength indicator (RSSI) associated with an advertisement received from short range wireless communication device 110, based on a signal power associated with a signal that includes the advertisement, and/or the like), device detector 140 may cause an output component of user interface 150 to sound an alarm or display an alert to notify an operator of machine 102 and/or the personnel of the proximity between machine 102 and the personnel.

In some implementations, device detector 140 may be used to log information associated with detecting when the short range wireless communication device 110 is within a threshold distance of machine 102. For example, using a media access control (MAC) identifier (e.g., a MAC address) associated with short range wireless communication device 110, device detector 140 may track when short range wireless communication device 110 (and/or personnel (or an identity of personnel) associated with short range wireless communication device 110) go within the threshold distance of machine 102. As such, the logged information can be assembled (e.g., into a report) to determine an amount of times personnel associated with short range wireless communication device 110 were in potentially hazardous conditions or were a part of potentially catastrophic events.

In some implementations, one or more components of example implementation 100 may be assembled or configured as a system to be attached to machine 102 (e.g., as an "aftermarket kit" or as a "replacement part") to detect short range wireless communication device 110 and/or a distance between machine 102 and short range wireless communication device 110. For example, the system may include one or more of receiver device 130, device detector 140, and/or user interface 150.

As indicated above, FIG. 1 is provided merely as an example. Other examples are possible and may differ from what was described with regard to FIG. 1.

Figure 2:
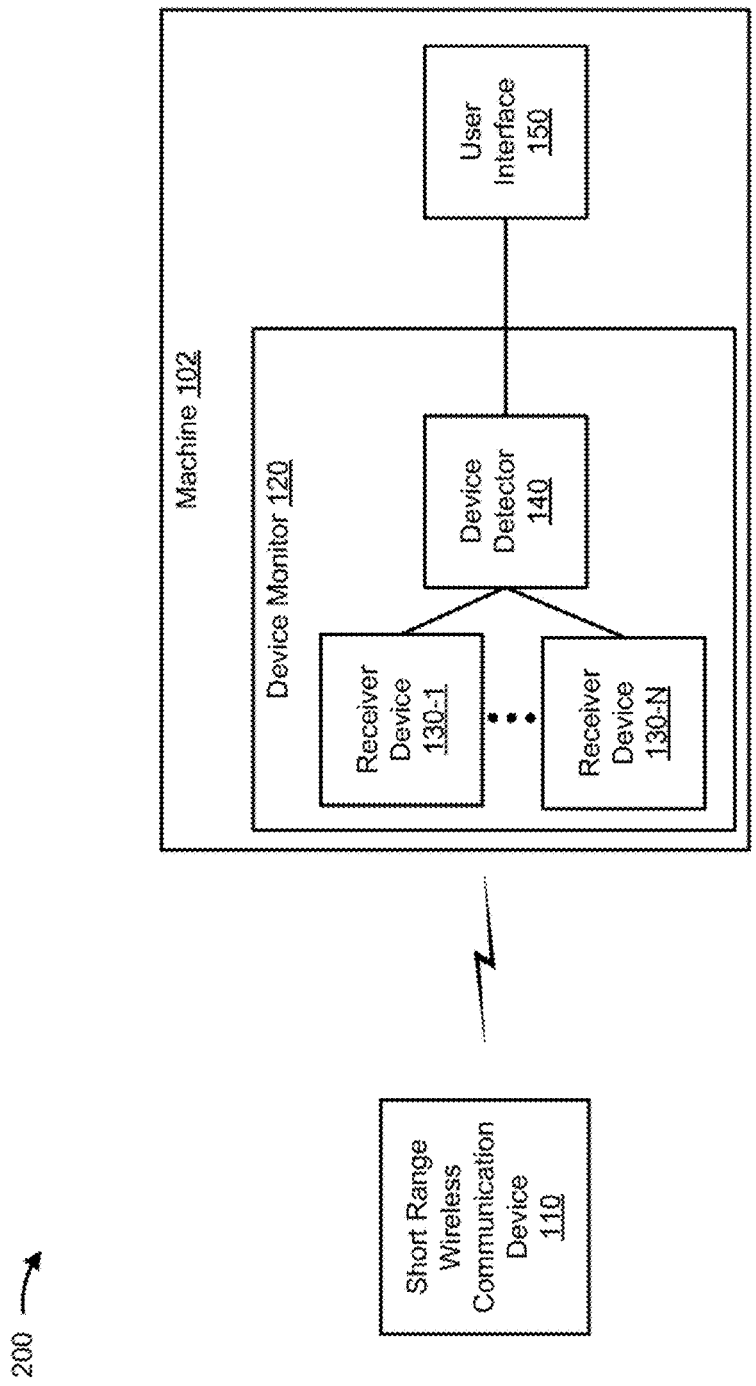
FIG. 2 is a diagram of an example system in which systems and/or methods, described herein, may be implemented.

FIG. 2 is a diagram of an example system in which systems and/or methods, described herein, may be implemented. As shown in FIG. 2, system 200 includes a machine 102 and short range wireless communication device 110. Machine 102, in system 200 of FIG. 2, includes a device monitor 120 with one or more receiver devices 130-1 through 130-N (where N is an integer and N≥1) (hereinafter referred to collectively as "receiver devices 130," and individually as "receiver device 130") and a device detector 140 and user interface 150. Components of system 200 may interconnect via electrical connections (e.g., wired and/or wireless connections), mechanical connections, or a combination of electrical and mechanical connections.

Machine 102 includes any type of machine as described herein. For example, machine 102 may include a vehicle, a backhoe loader, a cold planer, a wheel loader, a compactor, a feller buncher, a forest machine, a forwarder, a harvester, an excavator, an industrial loader, a knuckleboom loader, a material handler, a motor grader, a pipelayer, a road reclaimer, a skid steer loader, a skidder, a telehandler, a tractor, a dozer, a tractor scraper, or other paving or underground mining equipment.

Short range wireless communication device 110 includes any device capable of generating, storing, processing, and/or providing information associated with transmitting a short range wireless communication signal (which may include a short range wireless communication advertisement). For example, short range wireless communication device 110 may include a communication device (e.g., a radio), a processor, or the like to generate and transmit (e.g., broadcast) a signal that may be detected by device detector 140.

Device monitor 120 includes receiver devices 130 and device detector 140. Device monitor 120 may be associated with a housing and/or structure configured to hold receiver devices 130 and device detector 140. In some implementations, device monitor may include a circuit (e.g., implemented using a printed circuit board (PCB)) that is configured to include and/or be connected to receiver devices 130 and/or device detector 140. As described herein, device monitor 120, may receive, via receiver devices 130, signals from short range wireless communication device 110, and process, via device detector 140, the signals to determine whether short range wireless communication device is within a threshold distance of machine 102.

Receiver device 130 includes one or more devices capable of receiving a signal (e.g., a radio frequency (RF) signal) from short range wireless communication device 110. For example, receiver device 130 may include an antenna, a signal reflector, or the like. As such, receiver device 130 may include a signal reflector that amplifies and/or attenuates a signal based on a direction from which the signal is received. For example, the signal reflector for receiver device 130 may amplify a signal received by an antenna when received from a first field of view (i.e., amplifying the signal) and attenuate the signal (or strength of signals) received by the antenna when received from a second field of view. Accordingly, receiver device 130 may be configured to enable device detector 140 to directionally receive a signal from short range wireless communication device 110 by amplifying and/or attenuating a short range wireless communication signal associated with the signal. For example, receiver device 130 may be configured to receive the signal from short range wireless communication device 110 such that device detector 140 only receives or recognizes the signal from short range wireless communication device 110 when short range wireless communication device 110 is in a particular field of view (e.g., angular range of detection) of receiver device 130 (and/or of machine 102) by amplifying the signal when received from that particular field of view and attenuating the signal when received from outside of that particular field of view. In some implementations, receiver device 130 may amplify the signal when received from the particular field of view such that a signal strength of a signal from the short range wireless communication device 110 satisfies a particular signal strength threshold to effectively be "received." In other words, a signal from short range wireless communication device 110 may be received when the signal satisfies a threshold signal strength, which may only occur when short range wireless communication device 110 is in the particular field of view or angular range of detection of receive device 130.

More specifically, receiver device 130 may be configured to amplify signals from short range wireless communication device 110 only when short range wireless communication device 110 is toward a back side of machine 102, toward a front side of machine 102, toward a left side of machine 102, or toward a right side of machine 102. In some implementations, machine 102 may include multiple receiver devices 130 configured to amplify signals from short range wireless communication device 110 at pre-configured angles. For example, system 200 may include a first receiver device 130-1 for a front side of machine 102, a second receiver device 130-2 for a back side of machine 102, a third receiver device 130-3 for a left side of machine 102, and a fourth receiver device 130-4 for a right side of machine 102. As such, multiple receiver devices 130 may be configured such that a full 360° field of view around machine 102 can be monitored for short range wireless communication device 110.

Receiver device 130 may provide the signals to device detector 140 in the form of signal data, an advertisement, and/or advertisement data. For example, receiver device 130 may receive a radio frequency (RF) signal from short range wireless communication device 110, and provide signal data, an advertisement, and/or advertisement data that is included in the signal to device detector 140.

Device detector 140 includes one or more apparatuses for detecting a distance between short range wireless communication device 110 and machine 102. In some implementations, device detector 140 is positioned within a base or near a vertex of receiver device 130. For example, if receiver device 130 is V-shaped, device detector 140 may be positioned at the vertex of the V. Device detector 140 is implemented as a processor, such as a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. The processor is implemented in hardware, firmware, or a combination of hardware and software. In some implementations, device detector 140 includes one or more processors capable of being programmed to perform a function. In some implementations, one or more memories, including a random access memory (RAM), a read only memory (ROM), and/or another type of dynamic or static storage device (e.g., a flash memory, a magnetic memory, and/or an optical memory) may store information and/or instructions for use by device detector 140.

Device detector 140 may receive one or more signals from short range wireless communication device 110 via receiver device 130. As described herein, based on one or more parameters of the one or more signals received via receiver device 130, device detector 140 may perform an action (e.g., to indicate the proximity of short range wireless communication device 110 to machine 102). For example, device detector 140 may detect the short range wireless communication device 110 is within a threshold proximity based on an RSSI of the signal satisfying a threshold (e.g., being greater than a threshold RSSI), based on a signal power of the signal satisfying a threshold, and/or the like.

User interface 150 may include a graphical user interface, a non-graphical user interface, a text-based user interface, a sound-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which user interface 150 is displayed, and/or a set of configurations based on capabilities and/or specifications associated with a device on which the user interface is displayed.

User interface 150 may include one or more output components that provides output information. For example, user interface 150 may include at least one of a speaker, one or more light-emitting diodes (LEDs), a display (e.g., an LED display, an organic LED (OLED) display, a liquid crystal display (LCD), or the like), a vibration device, a printer, or the like. Accordingly, user interface 150 may provide output information audibly, visually, haptically (e.g., via vibrations), or the like. According to some implementations, one or more of the output components of user interface 150 may be included within a cab of machine 102, within which an operator controls one or more functions of machine 102. Accordingly, user interface 150, when indicating a distance between short range wireless communication device 110 and machine 102 and/or that short range wireless communication device 110 is within a threshold distance of machine 102, may provide such an indication to an operator of machine 102. Additionally, or alternatively, one or more of the output components of user interface 150 may be located on an exterior of machine 102 (e.g., exterior from the cab of machine 102) and directed toward a particular direction from machine 102 (e.g., a direction associated with the location of short range wireless communication device 110). As such, the one or more output components of user interface 150 may be configured to indicate the distance between short range wireless communication device 110 and machine 102 and/or that short range wireless communication device 110 is within a threshold distance of machine 102 to an individual outside of machine 102 (e.g., personnel associated with short range wireless communication device 110). In some implementations, user interface 150 can be implemented or included within a diagnostic device and/or calibration device that is separate from machine 102.

The number and arrangement of components shown in FIG. 2 are provided as an example. In practice, there may be additional components, fewer components, components, or differently arranged components than those shown in FIG. 2. Furthermore, two or more components shown in FIG. 2 may be implemented within a single component, or a single component shown in FIG. 2 may be implemented as multiple, separate, and/or distributed components. Additionally, or alternatively, a set of components (e.g., one or more components) of system 200 may perform one or more functions described as being performed by another set of components of system 200.

Figure 3:
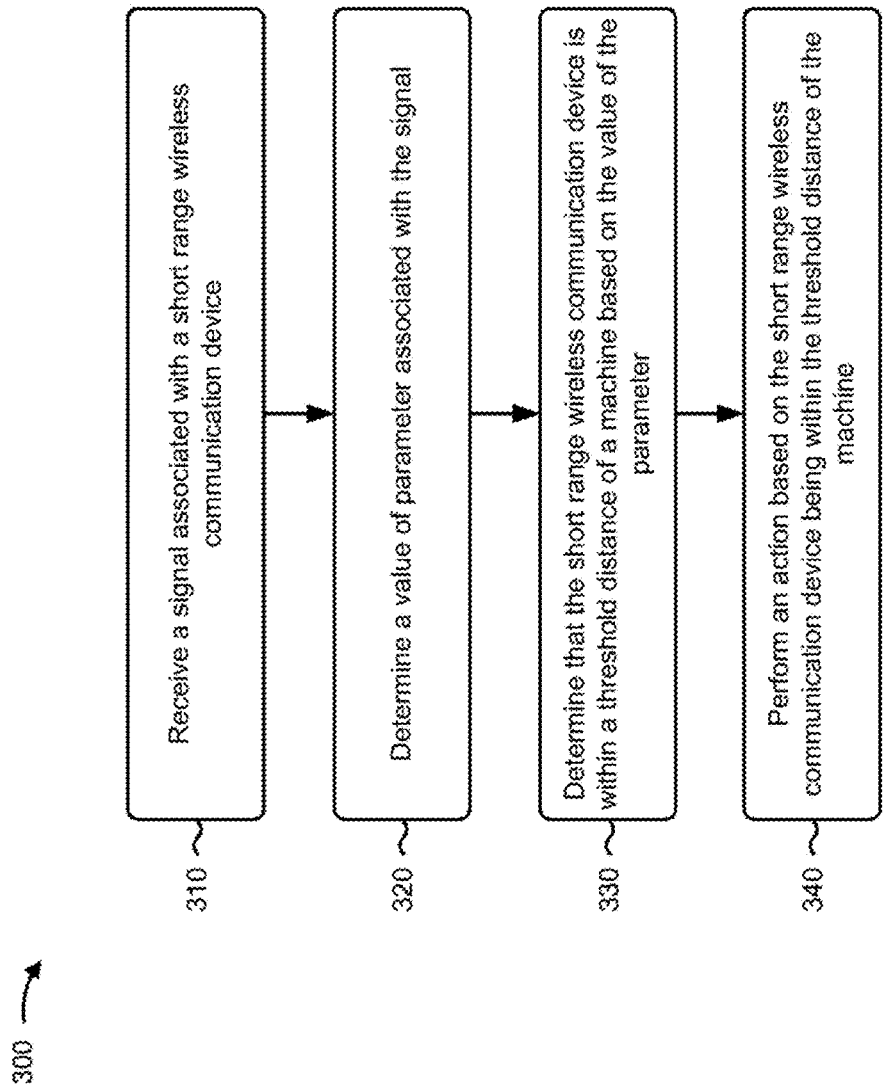
FIG. 3 is a flow chart of an example process for proximity detection using a short range wireless communication device.

FIG. 3 is a flow chart of an example process 300 proximity detection using a short range wireless communication device. In some implementations, one or more process blocks of FIG. 3 may be performed by device monitor 120. In some implementations, one or more process blocks of FIG. 3 may be performed by another device or a group of devices separate from or including device monitor 120, such as machine 102, short range wireless communication device 110, receiver device 130, device detector 140, and/or user interface 150.

As shown in FIG. 3, process 300 may include receiving a signal associated with a short range wireless communication device (block 310). For example, device monitor 120 may receive, via receiver device 130, the signal from short range wireless communication device 110. In some implementations, device monitor 120 may receive the signal based on being configured within or on machine 102 to receive the signal from short range wireless communication device 110, based on being powered on, based on machine 102 being powered on, based on being activated (e.g., by a user input from user interface 150), or the like.

According to some implementations, the signal may include an advertisement associated with short range wireless communication device 110. The advertisement may be transmitted from short range wireless communication device 110 according to a configuration of short range wireless communication device 110. For example, short range wireless communication device 110 may periodically (e.g., every fraction of a second, every second, every two seconds, or the like) or aperiodically (e.g., based on detection of an event, based on being in a particular location, or the like) broadcast the advertisement to indicate the presence of short range wireless communication device 110 to other devices (e.g., to device monitor 120). In some implementations, the advertisement may include data (which may be referred to herein as "advertisement data"). The advertisement data may include a MAC identifier (e.g., a MAC address), a voltage level of a battery of short range wireless communication device 110, a counter value (e.g., indicating a packet count associated with short range wireless communication device 110), a value representing path loss from a transmitter to a receiver (e.g., a receiver that is less than 1 meter from the transmitter) of short range wireless communication device 110, or the like. As described herein, device monitor 120 (e.g., via device detector 140) may determine the RSSI and/or signal power associated with the advertisement (e.g., based on an amount of power present in the signal that included the advertisement). Additionally, or alternatively, the signal may include other information associated with short range wireless communication device 110. For example, the signal may include information to establish a communication session with short range wireless communication device 110, data associated with a communication session of short range wireless communication device 110, and/or the like.

In some implementations, device monitor 120 receives the signal and corresponding advertisement data via receiver device 130. Receiver device 130 may be configured to receive the signal from a particular direction relative to machine 102. Accordingly, the signal, when received by receiver device 130, may indicate a direction associated with short range wireless communication device 110. For example, when received via receiver device 130, device monitor (e.g., via device detector 140) may determine that short range wireless communication device 110 is toward a front side, a back side, a left side, or a right side of machine 102. As such, device monitor 120 may use receiver device 130 to determine from which direction, relative to machine 102, the signal was received.

In this way, device monitor 120 may receive a signal from short range wireless communication device 110 to permit device monitor 120 to determine a parameter associated with the signal.

As further shown in FIG. 3, process 300 may include determining a value of a parameter associated with the signal (block 320). For example, device monitor 120, via device detector 140, may determine the value of the parameter based on a measurement made when receiving the signal. In some implementations, device monitor 120 may determine the parameter based on receiving the signal, based on one or more characteristics of an advertisement of the signal (e.g., a particular MAC ID associated with the advertisement, or the like), based on receiving the signal via receiver device 130, or the like.

According to some implementations, the parameter may include an RSSI associated with the signal. As such, the value of the RSSI may indicate a power level of the signal. In some implementations, the parameter may include the MAC ID of the short range wireless communication device 110, a voltage level of a battery of short range wireless communication device 110, a counter value associated with short range wireless communication device 110, a value representing path loss from a transmitter to a receiver (e.g., a receiver that is less than 1 meter from the transmitter) of short range wireless communication device 110, or the like. In such cases, the value of the parameter may indicate a particular MAC ID associated with short range wireless communication device 110, remaining battery power of short range wireless communication device 110, a packet count associated with short range wireless communication device 110, or the like.

Device monitor 120 may determine the value of the parameter associated with the signal using any suitable technique or analysis. For example, device monitor 120, via device detector 140, may determine the RSSI and/or signal power associated with the signal by analyzing the signal as provided by receiver devices 130. In some implementations, device monitor 120 may parse and/or analyze information, associated with short range wireless communication device 110, that is included within signal data, an advertisement, and/or advertisement data of the signal received by receiver device 130. For example, device monitor 120, via device detector 140, may identify a MAC ID of short range wireless communication device 110, a battery level of short range wireless communication device 110, a counter value associated with short range wireless communication device 110, a value representing path loss from a transmitter to a receiver (e.g., a receiver that is less than 1 meter from the transmitter) of short range wireless communication device 110, or the like.

In this way, device monitor 120 may determine a value of a parameter associated with the signal to permit device monitor 120 to determine a distance between short range wireless communication device 110 and machine 102 and/or that short range wireless communication device 110 is within a threshold distance of machine 102.

As further shown in FIG. 3, process 300 may include determining that the short range wireless communication device is within a threshold distance of a machine based on the value of the parameter (block 330). For example, device monitor 120, via device detector 140, may determine that short range wireless communication device 110 is within a threshold distance (e.g., similar to threshold distance 112 of FIG. 1) of machine 102. In some implementations, device monitor 120 may determine that short range wireless communication device 110 is within the threshold distance based on determining the value of the parameter.

In some implementations, the threshold distance may be any distance (e.g., three meters, six meters, eighteen meters, or the like) that device monitor 120 is configured to monitor. According to some implementations, the threshold distance may correspond to a hazardous condition or catastrophic event that may occur during operation of machine 102. For example, if short range wireless communication device 110 (and correspondingly personnel associated with short range wireless communication device 110) is determined to be within the threshold distance of machine 102, device monitor 120 may determine that a hazardous condition has been encountered or is about to be encountered or that a catastrophic event has occurred or is about to occur.

In some implementations, the threshold distance may be configurable based on user input. For example, an operator can configure the threshold distance (e.g., via user interface 150 of machine 102). In some implementations, artificial intelligence (e.g., machine learning) may be utilized to learn or determine preferred threshold distances. In some implementations, operator feedback may be used to automatically adjust a threshold distance. In such an example, an operator, via user interface 150, may indicate that an alert or alarm was ignored or incorrect when device monitor 120 indicated that short range wireless communication device 110 was within the threshold distance. As such, device monitor 120 may automatically decrease the threshold distance (e.g., so that the alarm does not go off at that threshold distance when short range wireless communication device 110 is at that distance at a later time).

Device monitor 120, via device detector 140, may determine a distance between short range wireless communication device 110 and machine 102 based on the value of the parameter. For example, device detector 140 may determine that short range wireless communication device 110 is within a threshold distance of machine 102 based on the value of the parameter satisfying a particular threshold corresponding to the threshold distance. In some implementations, device detector 140 may compare the value of the parameter to a threshold value of the parameter that corresponds to the threshold distance and determine that short range wireless communication device 110 is within the threshold distance when the value of the parameter satisfies the threshold value of the parameter. For example, device detector 140 may determine that the value of the RSSI associated with the signal (or associated with receiving the signal) satisfies a threshold RSSI (e.g., is greater than a threshold RSSI value) associated with the threshold distance. Additionally, or alternatively, device detector 140 may determine that the value of a signal power of the signal (or associated with receiving the signal) satisfies a threshold signal power (e.g., is greater than a threshold signal power value) associated with the threshold distance. In such cases, when the value of the RSSI and/or signal power satisfies the respective threshold, device detector 140 correspondingly determines that short range wireless communication device 110 is within the threshold distance of machine 102.

The example threshold distance (and/or corresponding value of the parameter) can be configurable and/or adjustable (e.g., via user input received via user interface) based on one or more factors. For example, device monitor 120 may implement and/or include a data structure used to determine a threshold value associated with the threshold distance based on information in the signal and/or how the signal was received (e.g., through which receiver device 130 the signal was received). For example, the data structure may include a mapping of values of one or more parameters of a signal and a corresponding distance between short range wireless communication device 110 and machine 102. For example, a mapping of values of RSSI to distances between short range wireless communication device 110 and machine 102 may be used to determine the distance between short range wireless communication device 110 and machine 102 based on RSSI of the signal. As such, device monitor 120 may use the mapping to determine the distance between short range wireless communication device 110 and machine 102.

In some implementations, the threshold distance may be different based on an identifier (e.g., a MAC ID) associated with short range wireless communication device 110. For example, device monitor 120 may determine that a first set of MAC IDs, associated with a first set of short range wireless communication devices 110 assigned to a first set of personnel, may have a first threshold distance, while a second set of MAC IDs, associated with a second set of short range wireless communication devices 110 assigned to a second set personnel, may have a second threshold distance. As such, device monitor 120 may determine or be configured to determine that some short range wireless communication devices 110 assigned to certain personnel (e.g., personnel with a relatively high level of experience) may be authorized to work closer to machine 102 than other personnel (e.g., personnel with a relatively low level of experience), or vice versa.

Additionally, or alternatively, the threshold distance may be different based on which receiver device 130 received and/or provided the signal to device detector 140 of device monitor 120. For example, the threshold distance may be shorter on the sides than in the front or back of machine 102 because machine 102 may not move as easily sidewise as machine 102 moves forward or backward. Accordingly, device monitor 120 may determine that short range wireless communication devices 110 is within the threshold distance depending on one or more characteristics associated with receiving the signal.

In this way, device monitor 120 may determine that short range wireless communication device 110 is within a threshold distance of machine 102 to permit device monitor 120 to perform an action associated with short range wireless communication device 110 and/or machine 102.

As further shown in FIG. 3, process 300 may include performing an action based on the short range wireless communication device being within the threshold distance of the machine (block 340). For example, device monitor 120 may perform the action. In some implementations, device monitor 120 may perform the action based on determining short range wireless communication device 110 is within the threshold distance of machine 102, or the like.

In some implementations, device monitor 120 may perform an action including causing user interface 150 to indicate that short range wireless communication device 110 is within the threshold distance of machine 102. For example, device monitor 120 may cause an output component of user interface 150 to alert an operator that short range wireless communication device 110 (and corresponding personnel wearing or carrying short range wireless communication device 110) is within a threshold distance of machine 102. In some implementations, device monitor 120 may cause an output component of user interface 150 that is directed toward the short range wireless communication device 110 (e.g., a speaker or buzzer on the exterior of machine 102) to sound an alarm to alert personnel that short range wireless communication device 110 is within the threshold distance of machine 102.

In some implementations, device monitor 120 may perform an action including logging that short range wireless communication device 110 is within the threshold distance of machine 102. For example, device monitor 120 may record, in a log, that short range wireless communication device 110 is within the threshold distance of machine 102. In some implementations, device monitor 120 may record a MAC ID associated with short range wireless communication device 110 (which may be obtained from the signal), such that personnel associated with short range wireless communication device 110 may be identified from the log. As such, device monitor 120 may log that personnel associated with short range wireless communication device was within a threshold distance of machine 102. Accordingly, for example, an entity (e.g., an individual or organization) associated with machine 102 or an operation of machine 102 can identify when certain personnel (e.g., personnel assigned to short range wireless communication device 110) were within a threshold distance of machine 102. As such, the entity may determine a number of hazardous conditions and/or catastrophic events that occurred and which personnel were involved in those hazardous conditions or catastrophic events.

In some implementations, device monitor 120 may perform an action including causing a notification (e.g., a message, an email, a text, or the like) to be sent to one or more devices associated with an operation or organization that operates and/or owns machine 102, short range wireless communication device 110, and/or device monitor 120. For example, device monitor 120 may cause the notification to be sent to a user device (e.g., a smartphone, a computer, or the like) or a server device of a site manager, a back office system, or the like. Accordingly, device monitor 120 may notify remotely located personnel of the presence of a hazardous condition and/or the occurrence of a catastrophic event.

In some implementations, device monitor 120 may be configured to vary a level or type of an alert via one or more of the output components of user interface 150 and/or systems based on a determined distance between short range communication device 110 and machine 102. For example, device monitor 120 may cause a loudness of an alarm from a speaker of user interface 150 to be inversely proportional to a distance between short range wireless communication device 110 and machine 102 (and/or receiver device 130). Additionally, or alternatively, device monitor 120 may cause an alert to be sent via different output components of user interface 150 and/or devices (e.g., user devices and/or server devices) at various times based on the distance between short range wireless communication device 110 and machine 102. Therefore, different people (e.g., an operator, personnel outside of machine 102 (personnel on the ground), a site manager, or the like) can be notified based on the distance between short range wireless communication device 110 and machine 102. For example, at a first distance, user interface 150 (e.g., based on information from device monitor 120) may notify personnel on the ground via an output component on the exterior of machine 102, at a second distance, user interface 150 may notify the personnel on the ground and an operator of machine 102 via an output component in a cab of machine 102, and, at a third distance, user interface 150 may notify the personnel on the ground, the operator, and a site manager (e.g., via an output component that is remote to the location of machine 102, via an alert to a user device (e.g., a mobile phone, a smartphone, a tablet, and/or the like) associated with the site manager, and/or the like).

In some implementations, device monitor 120 may perform an action to automatically control one or more features of machine 102. For example, device monitor 120 may adjust a speed of machine 102 (e.g., by applying braking, lowering an engine speed, shifting a gear of a transmission, placing a transmission in neutral, and/or the like). In some implementations, the degree of the adjustment to the speed may be based on the distance between short range wireless communication device 110 and machine 102. For example, as the distance is shorter between short range wireless communication device 110 and machine 102, the slower the speed at which device monitor 120 causes machine 102 to move. In some implementations, device monitor 120 may automatically stop machine 102 based on the distance between short range wireless communication device 110 and machine 102. In some implementations, device monitor 120 may cause a camera mounted on machine 102 to be activated to enable an image from the camera to be displayed via a display of user interface 150 in a cab of machine 102.

Device monitor 120 may perform any one or more of the described actions based on short range wireless communication device 110 being within a threshold distance of machine 102 and/or based on a determined distance between short range wireless communication device 110 and machine 102. As such, device monitor 120 may perform one or more of the actions described herein alone or in combination with one another.

In this way, device monitor 120 may perform an action associated with determining short range wireless communication device 110 is within a threshold distance of machine 102.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

Figure 4:
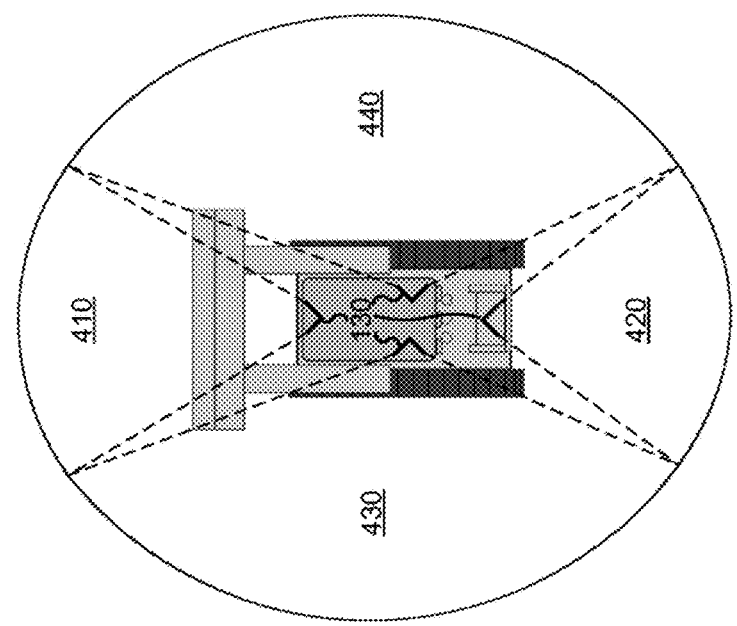
FIGS. 4 and 5 are diagrams of example implementations relating to the example process shown in FIG. 3.

FIG. 4 is a diagram of an example implementation 400 relating to example process 300 shown in FIG. 3. FIG. 4 shows an example of proximity detection using a short range wireless communication device. As shown in FIG. 4, a machine (e.g., machine 102) is configured with a plurality of receiver devices 130 (shown as four receiver devices). Receiver devices 130 are configured to receive signals from short range wireless communication devices (e.g., short range wireless communication devices similar to short range wireless communication device 110) from designated angular ranges of detection of the receiver devices 130 (and/or the machine), such that the respective receiver devices 130 can receive signals from directional areas 410, 420, 430, and 440.

As shown in FIG. 4, a front directional area 410 is shown in front of the machine, a back directional area 420 is shown in back of the machine, a left side directional area 430 is shown to the left of the machine, and a right side directional area 440 (referred to collectively herein as directional areas) is shown to the right of the machine. As such, each one of receiver devices 130 may be configured such that signals with signals in the respective directional area is amplified from that direction area and attenuated from other directional areas. For example, if a short range wireless communication device is in front of the machine in front directional area 410, the one of the receiver devices 130 configured to receive signals from front directional area 410 may amplify the signals from the short range wireless communication device while the other receiver devices 130 directed toward directional areas 420, 430, and 440 may attenuate the signals from the short range wireless communication device. As such, a device detector (e.g., similar to device detector 140) may determine from which direction of the machine the signal was received based on which of the receiver devices 130 received the signal (or advertisement). In some implementations, if a short range wireless communication device is within a threshold distance of the machine in one of the directional areas 410, 420, 430, or 440, the device detector may perform an action including causing an alert (e.g., within a cab of the machine or toward the directional area of the short range wireless communication device) and indicating the direction of the short range wireless communication device to an operator (e.g., via a display component of a user interface in the cab).

As indicated above, FIG. 4 is provided as an example. Other examples are possible and may differ from what was described with regard to FIG. 4.

Figure 5:
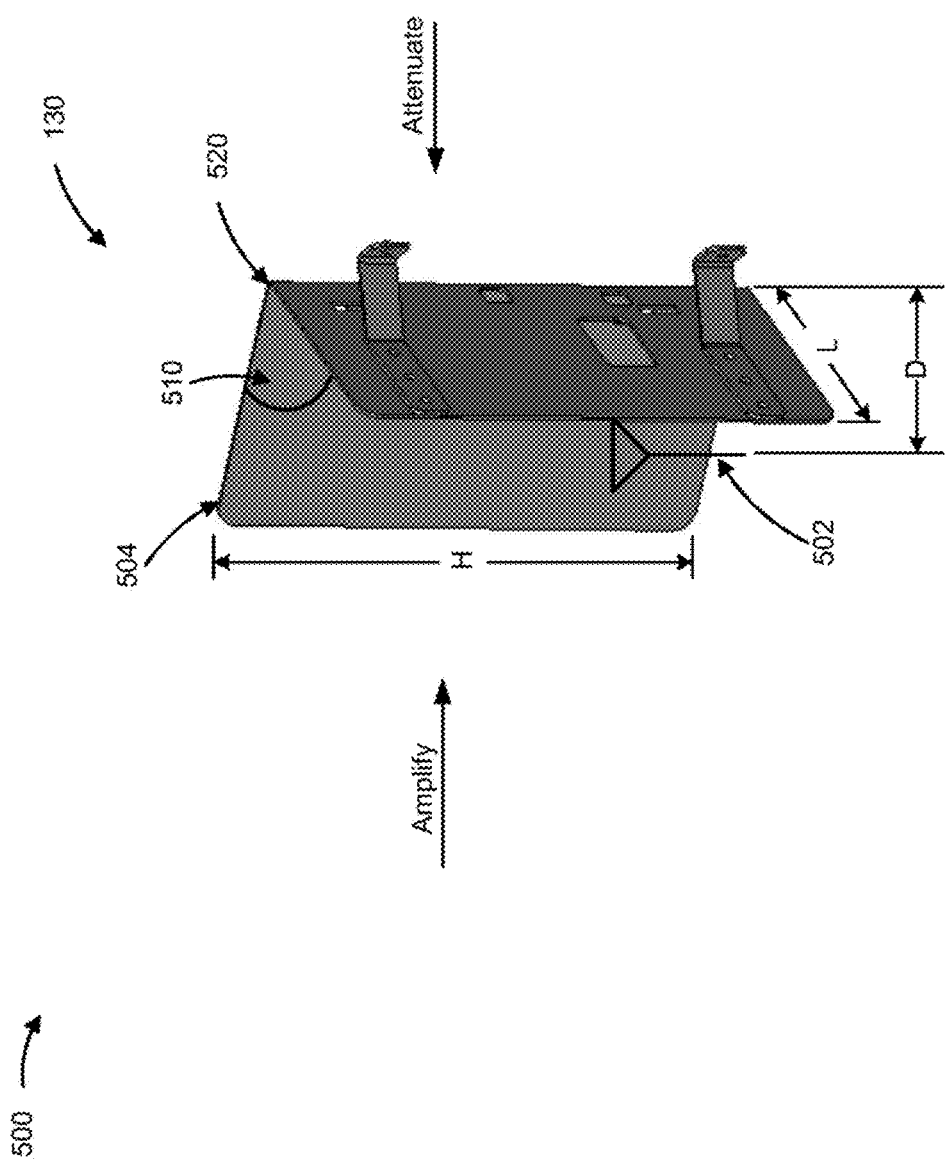

FIG. 5 is a diagram of an example implementation 500 relating to example process 300 shown in FIG. 3. FIG. 5 shows an example of a receiver device 130 (which may be used to implement receiver device 130 of FIGS. 1 and/or 2) of device monitor 120. Receiver device 130 of FIG. 5 may include an antenna 502 and reflector 504 to form a V-shaped receiver device 130. Antenna 502 may be connected to device detector 140 and provide signal data from RF signals received by receiver device 130. Receiver device 130 may be used for proximity detection with a short range wireless communication device (e.g., short range wireless communication device 110). In FIG. 5, the V-shaped receiver device 130 is configured such that signals received from an amplification angle 510 are amplified by reflector 504 and signals not received from that amplification angle are attenuated by reflector 504. The amplification angle 510 may be defined by the angle of a vertex 520 of receiver device 130.

In some implementations, antenna 502 may be positioned within reflector 504 and/or situated within or near vertex 520 of the reflector 504. In such cases, a line of sight to the antenna 502 may be defined by amplification angle 510. In some implementations, antenna 502 may be positioned within the amplification angle 510 of reflector 504 and centered between plates of reflector 504 at a distance D (e.g., half wavelength of the signal or approximately 62 millimeters for a 2.4 Ghz signal) from vertex 520 of the V-shaped receiver device 130 of FIG. 5. In some implementations, each plate of the V-shaped reflector may have a length L and a height H. The length may be twice the distance D (e.g., L=2D) from antenna 502 to vertex 520 and the height may be based on a dimension of a substrate (e.g., a PCB) associated with device monitor 120 and/or device detector 140 (e.g., H may be equal to a dimension of a PCB of device detector 140, a multiple of a dimension of the PCB of device detector 140, and/or the like). In such cases, signals received from short range wireless communication device 110 may be focused directly toward antenna 502. In some implementations, device detector 140 may be included within or near vertex 520 of reflector 504.

Accordingly, while antenna 502 may receive signals from all angles (e.g., because RF radiation is not line of sight) as received by receiver device 130, signals received via the line of sight of 502, as defined by the amplification angle 510 of reflector 504, are amplified more than signals received outside of the amplification angle 510. Accordingly, the V-shape of receiver device 130 of FIG. 5 may amplify signals (e.g., by focusing or concentrating the signals) received within line of sight of the amplification angle 510. For example, with the V-shaped receiver device 130 of FIG. 5, an RSSI of a signal from a +5 decibel-milliwatt (dBm) short range wireless communication device 110 may be approximately +4 decibels (dB) higher with the V-shaped receiver device 130 than without the V-shaped receiver device 130. In such cases, the signals may be amplified to satisfy a threshold signal strength (e.g., a threshold RSSI and/or a threshold signal power). Accordingly, device monitor 120 determines whether or not short range wireless communication device 110 is within the threshold distance based on whether or not the RSSI and/or signal power satisfies a threshold value or parameter. For example, if the RSSI and/or signal power exceeds a threshold RSSI value and/or threshold signal power, device monitor 120 may determine that the short range wireless communication device 110 is within the threshold distance of machine 102. As such, the signal may need to be received from short range wireless communication device 110 when short range wireless communication device 110 is within line of sight of antenna 502, as defined by the amplification angle 510 of the V-shaped receiver device 130 of FIG. 5.

Additionally, or alternatively, the V-shaped receiver device 130 may attenuate (or degrade) signals received from outside of the line of sight to antenna 502, when antenna 502 is positioned within the vertex of the V-shaped receiver device 130. Accordingly, signals received from short range wireless communication device 110, when not in line of sight of device detector 140, may be attenuated. In such cases, device detector 140 does not determine that short range wireless communication device 110 is within a threshold distance of machine 102, and thus, may not take any action (e.g., to notify an operator or user associated with short range wireless communication device 110).

In some implementations, to detect short range wireless communication devices in a wider field of view or shorter field of view, amplification angle 510 can be altered. For example, to detect short range wireless communication devices in a wider field of view, amplification angle 510 can be increased, and to detect short range wireless communication devices in a narrower field of view, amplification angle 510 can be decreased.

As indicated above, FIG. 5 is provided as an example. Other examples are possible and may differ from what was described with regard to FIG. 5.

INDUSTRIAL APPLICABILITY

The device monitor 120 may be used with any machine 102 where proper detection of other machines, objects, and/or personnel is desired. The disclosed device monitor 120 may provide information for identifying when a short range wireless communication device 110 and/or corresponding personnel wearing and/or carrying short range wireless communication device is within a threshold distance of machine 102 and/or a direction of where short range wireless communication device 110 is located. Receiver device 130 may receive a signal from short range wireless communication device 110 (and/or indicate a direction of short range wireless communication device 110 based on a configuration of receiver device 130). Device monitor 120 may compare a value of a parameter (e.g., RSSI, signal power, and/or the like) associated with the signal to a threshold, and may determine whether to output an alert (e.g., via an output component of user interface 150) based on a result of the comparison. Additionally, or alternatively, device monitor 120 may perform one or more calculations based on a received advertisement included within the signal, and may determine whether to output the alert based on the one or more calculations. The alert may indicate, to an operator of machine 102 that short range wireless communication device 110 is within the threshold distance and/or on a particular side, in front, or in back of machine 102 (or other particular angle relative to machine 102).

During operation of machine 102 and/or a system 200 including device monitor 120, short range wireless communication device 110 may repeatedly broadcast a signal, which may be received by device monitor 120 via receiver device 130. Detection of short range wireless communication device 110 may indicate a potential hazardous condition or catastrophic event. In such cases, device monitor 120 may cause a report to be generated, which can be used by an entity or human operator (e.g., a site manager, an organization, an operating company, an owner entity, and/or the like) to identify actions that are potentially hazardous and/or catastrophic. Furthermore, some implementations, described herein, may prevent a hazardous condition or catastrophic event (e.g., a collision), by alerting an operator and/or personnel to stop an action (e.g., continuing to move in a particular direction that would decrease a distance between short range wireless communication device 110 and machine 102) to avoid the hazardous condition or catastrophic event. Accordingly, hardware resources may be conserved by avoiding the need to repair and/or replace damaged parts caused by such hazardous conditions and/or catastrophic events.

According to some implementations, device monitor 120 is configured to monitor and/or receive signals (or advertisement signals) from short range wireless communication device 110. Because short range wireless communication device 110 is configured to broadcast the signals, device monitor 120 is not to be configured to be communicatively coupled with short range wireless communication device 110. In other words, a connection or communication session does not need to be established between short range wireless communication device 110 and device monitor 120. Accordingly, some implementations described herein may conserve processing resources and/or communication resources that would otherwise be used to establish a communication session between short range wireless communication device 110 and device monitor 120. Furthermore, processing resources can be conserved that would otherwise be used by device monitor 120 to establish communication sessions with short range wireless communication devices for communication, as device monitor 120 can determine the distance from short range wireless communication device 110 based on receiving a signal (and/or an advertisement) from short range wireless communication device 110.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

As used herein, the articles "a" and "an" are intended to include one or more items, and may be used interchangeably with "one or more." Also, as used herein, the terms "has," "have," "having," or the like are intended to be open-ended terms. Further, the phrase "based on" is intended to mean "based, at least in part, on."

The foregoing disclosure provides illustration and description, but is not intended to be exhaustive or to limit the implementations to the precise form disclosed. Modifications and variations are possible in light of the above disclosure or may be acquired from practice of the implementations. It is intended that the specification be considered as an example only, with a true scope of the disclosure being indicated by the following claims and their equivalents. Even though particular combinations of features are recited in the claims and/or disclosed in the specification, these combinations are not intended to limit the disclosure of possible implementations. Although each dependent claim listed below may directly depend on only one claim, the disclosure of possible implementations includes each dependent claim in combination with every other claim in the claim set.

What is claimed is:

1. A device comprising:
    a V-shaped receiver device to amplify a signal, associated with a short range wireless communication device, when the signal is received from an amplification angle defined by an angle of a vertex of the V-shaped receiver device,
        wherein one or more signals received from a different angle are attenuated, and
        wherein the different angle is different from the amplification angle; and
    one or more processors to:
        determine a value of a parameter associated with the signal;
        determine that the short range wireless communication device is within a threshold distance of a machine based on the value of the parameter; and
        perform an action based on the short range wireless communication device being within the threshold distance of the machine.

2. The device of claim 1, wherein the parameter comprises at least one of:
    a received signal strength indicator (RSSI) associated with the signal, or
    a signal power associated with the signal.

3. The device of claim 1, wherein the one or more processors, when determining that the short range wireless communication device is within the threshold distance, are to:
    use a mapping of one or more values of the parameter to one or more distances; and
    determine that the short range wireless communication device is within the threshold distance of the machine based on the mapping.

4. The device of claim 1, wherein the one or more processors, when determining that the short range wireless communication device is within the threshold distance, are to:
  determine a direction associated with receiving the signal based on the V-shaped receiver device; and
  determine that the short range wireless communication device is within the threshold distance based on the direction.

5. The device of claim 1, wherein the one or more processors, when determining that the short range wireless communication device is within the threshold distance, are to:
  identify an identifier associated with the short range wireless communication device,
    wherein the identifier is included in the signal; and
  determine that the short range wireless communication device is within the threshold distance based on the identifier.

6. The device of claim 1, wherein the one or more processors, when performing the action, are to at least one of:
  cause an output component within a cab of the machine to display an indication that the short range wireless communication device is within the threshold distance of the machine or sound an alarm to indicate that the short range wireless communication device is within the threshold distance of the machine, or
  cause an output component mounted on an exterior of the machine to display an indication toward the short range wireless communication device to indicate that the short range wireless communication device is within the threshold distance of the machine or sound an alarm toward the short range wireless communication device to indicate that the short range wireless communication device is within the threshold distance of the machine.

7. The device of claim 1, wherein the one or more processors, when performing the action, are to record, in a log, that the short range wireless communication device was within the threshold distance of the machine.

8. A system comprising:
  a receiver device to amplify a signal when the signal is received from a first field of view,
    wherein the receiver device is a V-shaped receiver device,
    wherein one or more signals received from a second field of view are attenuated,
    wherein the second field of view is different from the first field of view, and
    wherein the signal includes an advertisement associated with a short range wireless communication device; and
  a device detector to:
    receive, via the receiver device, the advertisement;
    determine a value of a parameter associated with the advertisement;
    determine that the short range wireless communication device is within a threshold distance of a machine based on the value of the parameter; and
    indicate, via one or more output components of a user interface, that the short range wireless communication device is within the threshold distance of the machine to notify an operator of the machine or personnel associated with the short range wireless communication device that the short range wireless communication device is within the threshold distance of the machine.

9. The system of claim 8, wherein the receiver device is configured to receive the advertisement from the short range wireless communication device within an angular range of detection of the receiver device.

10. The system of claim 8, wherein the receiver device is one of a plurality of receiver devices and the device detector is further to:
  determine a direction of the short range wireless communication device relative to the machine based on the receiver device being the one of the plurality of receiver devices that received the advertisement.

11. The system of claim 8, wherein the device detector, when determining that the short range wireless communication device is within the threshold distance, is to:
  compare the value of the parameter to a threshold value of the parameter,
    wherein the threshold value of the parameter corresponds to the threshold distance; and
  determine that the short range wireless communication device is within the threshold distance when the value of the parameter satisfies the threshold value of the parameter.

12. The system of claim 8, wherein the device detector, when determining the value of the parameter, is further to:
  determine a value of the parameter; and
  use a mapping of the value of the parameter to one or more distances to determine that the short range wireless communication device is within the threshold distance of the machine,
    wherein the parameter comprises a received signal strength indicator (RSSI) or a signal power.

13. The system of claim 8, wherein at least a first one of the one or more output components is located within a cab of the machine and a second one of the one or more output components is attached to an exterior of the machine,
  wherein the second one of the one or more output components is configured to sound an alarm toward the short range wireless communication device.

14. The system of claim 8, wherein the device detector is further to:
  cause a record, in a log, to be generated,
    wherein the record indicates that personnel, associated with short range wireless communication device, was within the threshold distance of the machine.

15. A method comprising:
  amplifying, by a receiver device associated with a machine, a signal, associated with a short range wireless communication device, when the signal is received from a first field of view,
    wherein the receiver device is a V-shaped receiver device,
    wherein one or more signals received from a second field of view are attenuated,
    wherein the second field of view is different from the first field of view, and
    wherein the signal includes an advertisement;
  determining, by the machine, a parameter associated with the advertisement;
  determining, by the machine, that the short range wireless communication device is within a threshold distance of the machine based on the parameter; and
  performing, by the machine, an action based on the short range wireless communication device being within the threshold distance of the machine.

16. The method of claim 15, further comprising:
  comparing the parameter to a threshold parameter, wherein the threshold parameter corresponds to the threshold distance; and determining that the short range wireless communication device is within the threshold distance when the parameter satisfies the threshold parameter, wherein the parameter comprises at least one of a received signal strength indicator (RSSI) or a signal power.

17. The method of claim 15, wherein determining that the short range wireless communication device is within the threshold distance comprises:

determining a direction associated with receiving the advertisement based on the receiver device; and determining that the short range wireless communication device is within the threshold distance based on the direction.

18. The method of claim 15, further comprising:

identifying an identifier associated with the short range wireless communication device, wherein the identifier is included in the advertisement; and determining the threshold distance based on the identifier.

19. The method of claim 15, wherein performing the action comprises:

performing the action to alert at least one of an operator of the machine or personnel associated with the short range wireless communication device.

20. The method of claim 15, wherein performing the action comprises:

logging an identity of personnel, associated with the short range wireless communication device, that was within the threshold distance of the machine.

* * * * *